(12) United States Patent
Herrmann et al.

(10) Patent No.: US 10,731,758 B2
(45) Date of Patent: Aug. 4, 2020

(54) PARKING LOCK OF AN AUTOMATIC TRANSMISSION FOR A VEHICLE

(71) Applicant: ZF Friedrichshafen AG, Friedrichshafen (DE)

(72) Inventors: Markus Herrmann, Scheidegg (DE); Marcel Gutzeit, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 101 days.

(21) Appl. No.: 16/159,849

(22) Filed: Oct. 15, 2018

(65) Prior Publication Data

US 2019/0120375 A1 Apr. 25, 2019

(30) Foreign Application Priority Data

Oct. 19, 2017 (DE) .................. 10 2017 218 747

(51) Int. Cl.
*F16H 63/34* (2006.01)
*B60T 1/00* (2006.01)
(Continued)

(52) U.S. Cl.
CPC .......... *F16H 63/3416* (2013.01); *B60T 1/005* (2013.01); *F16D 63/006* (2013.01);
(Continued)

(58) Field of Classification Search
CPC .. F16H 63/34; F16H 63/3416; F16H 63/3425; F16H 63/3475; F16H 63/3483;
(Continued)

(56) References Cited

U.S. PATENT DOCUMENTS 6,481,556 B1 11/2002 Haupt
9,145,113 B2 9/2015 Landino et al.
(Continued)

FOREIGN PATENT DOCUMENTS

DE 19837832 A1 2/2000
DE 102005024468 A1 12/2006
(Continued)

OTHER PUBLICATIONS

German Search Report DE102017218747.6 dated Jun. 26, 2018. (10 pages).

*Primary Examiner* — Jacob S. Scott
*Assistant Examiner* — Lori Wu
(74) *Attorney, Agent, or Firm* — Dority & Manning, P.A.

(57) ABSTRACT

A parking lock having a locking pawl engageable into a parking interlock gear, a connecting rod with an interlocking element to prevent the parking lock from disengaging when in the locked condition, a spring for engaging the parking lock, a hydraulically actuatable actuator for disengaging the parking lock, and an emergency release device for emergency disengagement of the parking lock. The piston is articulatedly connected to a first disk rotatably mounted on a selector shaft, a second disk connected to the selector shaft in a torsion-proof manner is articulatedly connected to the connecting rod, the spring is tensioned between the transmission housing and the second disk, and the emergency release device is connected to the selector shaft in a torsion-proof manner. The first disk is operatively connected to the second disk such that rotation of the second disk by the emergency release device does not rotate the first disk.

8 Claims, 6 Drawing Sheets

(51) Int. Cl.
*F16D 63/00* (2006.01)
*F16D 65/16* (2006.01)
*F16H 63/48* (2006.01)
*F16D 121/06* (2012.01)
*F16D 121/14* (2012.01)
*F16D 123/00* (2012.01)
*F16D 125/28* (2012.01)
*F16D 127/06* (2012.01)
*F16D 129/08* (2012.01)

(52) U.S. Cl.
CPC ......... *F16D 65/16* (2013.01); *F16H 63/3425* (2013.01); *F16H 63/3483* (2013.01); *F16H 63/3491* (2013.01); *F16H 63/48* (2013.01); *F16D 2121/06* (2013.01); *F16D 2121/14* (2013.01); *F16D 2123/00* (2013.01); *F16D 2125/28* (2013.01); *F16D 2127/06* (2013.01); *F16D 2129/08* (2013.01)

(58) Field of Classification Search
CPC ...... F16H 63/3491; F16H 63/48; B60T 1/005; F16D 65/16; F16D 63/006; F16D 2129/08; F16D 2127/06; F16D 2125/28; F16D 2123/00; F16D 2121/14; F16D 2121/06

See application file for complete search history.

(56) References Cited

U.S. PATENT DOCUMENTS

| 9,383,012 | B2 | 7/2016 | Popp et al. | |
|---|---|---|---|---|
| 2015/0308571 | A1* | 10/2015 | Wyatt | F16H 63/3491 192/219.5 |
| 2018/0141525 | A1* | 5/2018 | Tateno | F16H 63/3491 |
| 2018/0328489 | A1* | 11/2018 | Coats | B60T 1/062 |

FOREIGN PATENT DOCUMENTS

| DE | 102012210571 | A1 | 12/2013 |
|---|---|---|---|
| DE | 102014106527 | A1 | 11/2014 |
| DE | 102014223037 | A1 | 5/2016 |
| DE | 102015200978 | A1 | 7/2016 |

* cited by examiner

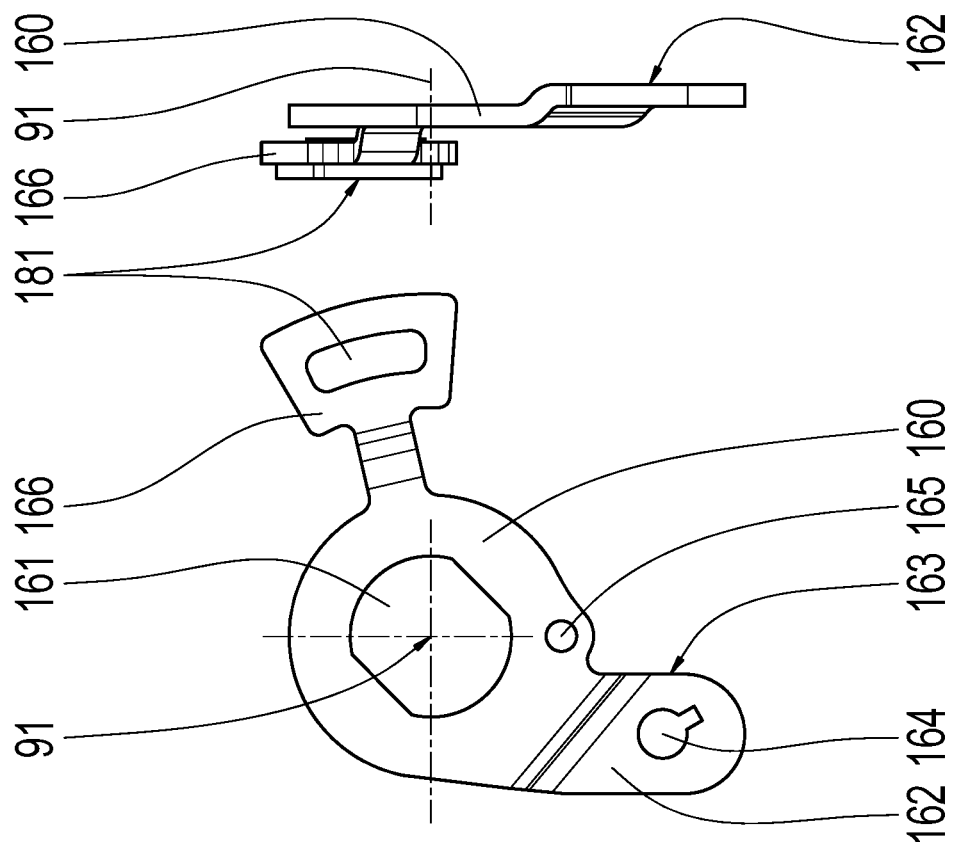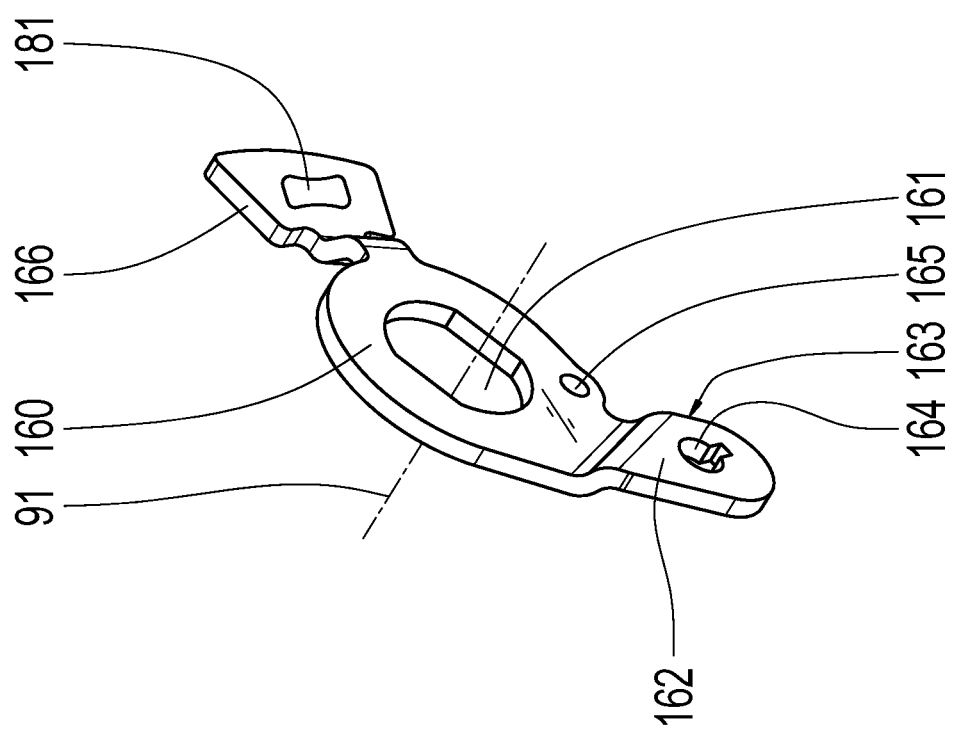
Fig. 5

PARKING LOCK OF AN AUTOMATIC TRANSMISSION FOR A VEHICLE

FIELD OF THE INVENTION

The present invention relates generally to a parking lock of an automatic transmission for a vehicle.

BACKGROUND

A parking lock of an automatic transmission is known as a device which secures the motor vehicle, in which the automatic transmission is installed, against rolling away. Various designs of these types of parking lock mechanisms are known from the related art. These parking lock mechanisms usually include a locking pawl which is pivotably mounted on a latch bolt and engages into or disengages from a parking interlock gear connected to the output shaft of the transmission, and an interlocking element arranged on a connecting rod to a selector disk mounted on a bolt. In the locked condition, the interlocking element is clamped between the locking pawl and a guiding plate in order to prevent the locking pawl from getting pushed out of a tooth space of the parking interlock gear. In this case, the interlocking element is spring-mounted on the connecting rod via a spring element. The engagement of the parking lock usually takes place mechanically via the spring force of an spring.

In modern automatic transmissions, a hydraulic system is frequently provided for disengaging the parking lock, in the case of which the end of the connecting rod facing away from the interlocking element is articulatedly connected on the selector disk which is operatively connected to a piston rod of a hydraulically actuatable parking lock piston, which is arranged in a parking lock cylinder and is axially displaceable against the force of the spring, which is usually a leg spring, for disengaging the parking lock and is axially displaceable by the force of the spring for engaging the parking lock.

In order to disengage such a parking lock, pressure is applied to the cylinder chamber of the parking lock cylinder, which pushes the parking lock piston and, therefore, the selector disk against the spring force of the leg spring into the "P_aus" position (parking lock disengaged). In order to additionally lock the parking lock piston of the parking lock cylinder in this position, a solenoid valve is mostly provided, which is electrically energized in this position of the parking lock cylinder and, as a result, actuates a detent mechanism acting on the parking lock piston.

In order to engage such a parking lock, the solenoid valve is de-energized again, wherein the cylinder chamber of the parking lock cylinder is vented and the mechanical interlock of the parking lock piston is released. Due to the preloaded leg spring on the selector disk, the selector disk and, therefore, the parking lock piston are brought into the "P_ein" position (parking lock engaged). In so doing, the interlocking element, which is generally a locking cone, is displaced on the guiding plate under the locking pawl and acts on the locking pawl such that a tooth of this locking pawl is engageable into a corresponding tooth space of the locking toothing of the parking interlock gear. In a tooth-on-tooth position, the spring element, with the aid of which the interlocking element is spring-mounted on the connecting rod, is preloaded, and so, as soon as a tooth of the locking pawl hits a tooth space, the locking pawl engages into the locking toothing of the parking interlock gear.

A hydraulically disengagable parking lock mostly also includes an emergency release in order to enable the locking pawl to be mechanically disengaged from its locking position in the event of a failure of the hydraulic pressure supply of the automatic transmission.

This type of parking lock system including a mechanical emergency release is known, for example, from DE 198 37 832 A1 which belongs to the applicant. In this case, the locking pawl of the parking lock is mechanically actuated, during normal operation, in the usual way via a detent disk which is turned or rotated via the spring force of an spring in order to mechanically engage the parking lock and is turned via the compressive force of a hydraulic cylinder in order to hydraulically disengage the parking lock. As an emergency release, a cam disk is additionally provided, which is arranged in parallel to the detent disk and is operatively connected via a driving part to the detent disk in such a way that the detent disk is turnable or rotatable by the cam disk, during emergency operation, in order to disengage the parking lock, without the detent disk turning the cam disk during normal operation.

Usually, the supply of pressure medium to the hydraulic cylinder of such a parking lock system, as well as the venting of this hydraulic cylinder, take place via a control valve or several hydraulically interacting control valves of the electro-hydraulic transmission control unit which is supplied with pressure medium by an oil pump which is driven by an engine provided for driving the transmission. To protect against an unintentional disengagement of the parking lock due to a malposition, which is present upon the start of the engine, of one or several of these control valves acting on the hydraulic cylinder of the parking lock system, DE 10 2012 210 571 A1, which belongs to the applicant, provides that the piston rod of the hydraulic cylinder is equipped with two electromagnetically actuatable locking systems which are actuated by the same electromagnet. In this case, the first locking system mechanically interlocks the piston rod a position associated with the disengaged condition of the parking lock and is present when the hydraulic cylinder is non-pressurized. The second locking system, on the other hand, mechanically interlocks the piston rod in a position associated with the engaged condition of the parking lock and, therefore, protects the parking lock system against an unintentional, i.e., fault-induced, disengagement of the previously properly engaged parking lock. A person skilled in the art refers to this type of parking lock actuating system as a "hydraulically actuatable parking lock actuator having bistable piston interlock." In the event of a failure of the electrohydraulic transmission control unit, it is no longer possible, however, to once again release the generally form-fit mechanical detent via the electromagnet, since the electrical control is disabled. An emergency release mechanically acting on the piston rod for manually disengaging the parking lock is therefore disabled in this parking lock system.

The problem addressed by the present invention is that of further developing the parking lock of an automatic transmission, which is known from DE 198 37 832 A1, in such a way that its emergency release functions even in the case of a utilization of a hydraulically actuatable parking lock actuator, which is known, for example, from DE 10 2012 210 571 A1, including bistable interlock of the parking lock actuator piston provided for disengaging the parking lock.

SUMMARY OF THE INVENTION

Accordingly, the present invention is directed to a parking lock for an automatic transmission in a motor vehicle. The parking lock includes a locking pawl, a connecting rod, an spring, a hydraulically actuatable actuator, and an emergency release device. The locking pawl is mounted on a latch bolt mounted in a housing of the automatic transmission so as to be turnable about a latch bolt longitudinal axis. The locking pawl includes a ratchet tooth which, in the engaged condition of the parking lock, engages into a tooth space of a locking toothing of a parking interlock gear acting on an output shaft of the automatic transmission to block the parking interlock gear and the output shaft against rotation. The connecting rod includes an interlocking element which is spring-mounted counter to the parking lock disengagement direction and which, upon engagement of the parking lock, brings about the engagement of the ratchet tooth of the locking pawl into a tooth space of the locking toothing of the parking interlock gear to prevent the ratchet tooth of the locking pawl from getting pushed out of the tooth space of the locking toothing of the parking interlock gear. The spring force of the spring is transmittable or transferable onto the connecting rod in order to engage the parking lock. The hydraulically actuatable actuator includes a piston which is axially displaceable in a control housing of the actuator and is displaceable with hydraulic pressure to disengage the parking lock, the axial movement of which is transmittable or transferable onto the connecting rod. The emergency release device is manually actuatable from outside the automatic transmission, the force of which is transmittable or transferable onto the connecting rod for the emergency release of the parking lock when the actuator is not operable.

In this case, the actuator includes a detent device which is actuatable by an electromagnet and mechanically fixes the piston of the actuator either in its first end position, which is associated with the disengaged condition of the parking lock, or in its second end position, which is associated with the engaged condition, when the electromagnet is not electrically energized. The electromagnet must be energized in order for the detent in the respective piston position to be released.

The emergency release device is connected, according to the invention, in a torsion-proof manner to a selector shaft which is mounted in the housing of the automatic transmission so as to be turnable about a selector shaft longitudinal axis, and so, upon actuation of the emergency release device, the selector shaft turns about the selector shaft longitudinal axis by a predefined angle in a direction of rotation intended for disengaging the parking lock.

According to the invention, the parking lock includes a first disk which is mounted on this selector shaft so as to be turnable about the selector shaft longitudinal axis, and which is connected or operatively connected to the piston of the actuator, and so an axial movement of the piston always brings about a turning of the first disk about the selector shaft longitudinal axis, and vice versa.

According to the invention, the parking lock also includes a second disk which is connected to the selector shaft in a torsion-proof manner and is articulatedly connected to an end of the connecting rod facing away from the interlocking element, and so a turning of the second disk always brings about an axial movement of the connecting rod, and vice versa. In this case, the spring is tensioned between the second disk and the housing of the automatic transmission such that the spring force of the spring acts mechanically, via the second disk, on the connecting rod in the direction intended for the engagement of the parking lock.

According to the invention, these two disks of the parking lock are mechanically operatively connected to each other via contact surfaces in such a way that a turning of the second disk initiated by the spring in the direction intended for the engagement of the parking lock brings about a turning of the first disk in the same direction, i.e., in the parking lock engagement direction, a turning of the first disk initiated by the piston of the actuator in the direction intended for the disengagement of the parking lock brings about a turning of the second disk in the same direction, i.e., in the parking lock disengagement direction, but a turning of the second disk initiated by the emergency release device does not bring about a turning of the first disk. As a result, in the case of an actuation of the emergency release device, the parking lock is disengagable by turning or rotating the second disk without obstruction by the piston of the actuator fixed in its second end position by the detent device.

In one preferred embodiment of the invention, the spring is a leg spring, the coils of which concentrically surround the selector shaft (or a cylindrical section of a hub which is connected in a torsion-proof manner to the selector shaft), the first leg of which rests against the housing or a housing-affixed component of the automatic transmission, and the second leg of which engages into a circular segment-shaped recess in the first disk as well as into a bore hole of the second disk. In this case, the arc-of-a-circle length of the recess of the first disk forms a defined open space, which is active in the direction of rotation, for the second leg of the spring.

In another embodiment of the invention, the selector shaft penetrates an outer wall of the housing of the automatic transmission, wherein the emergency release device is a lever which is arranged outside the housing of the automatic transmission and is connected, outside the housing, to the selector shaft in a rotationally fixed manner. Alternatively, the emergency release device is, for example, a lever which is arranged within the housing, connected to the selector shaft in a torsion-proof manner, and actuatable from outside the housing with the aid of a tool. This type of tool is, for example, a threaded pin which is or can be screwed into a tapped hole of the transmission housing suitable therefor and actuates the lever for the emergency disengagement of the parking lock when screwed in sufficiently far.

In one further embodiment of the invention, a sensor transmitter of a preferably contactless or non-contact measuring position sensor can be arranged on the second disk, with the aid of which it is detectable whether the parking lock is in the engaged condition or in the disengaged condition.

In one refinement of the invention, a hold-down spring is attachable to or hung into the locking pawl, which, in the disengaged condition of the parking lock, reliably prevents the locking pawl from coming into contact with the parking interlock gear. In this case, the hold-down spring is, for example, a leg spring made of spring wire in a cost-effective way, the coils of which concentrically surround the latch bolt and the first leg of which engages into a recess in the locking pawl and the second leg of which rests against the housing or a housing-affixed component of the automatic transmission.

BRIEF DESCRIPTION OF THE DRAWINGS

The invention is described in greater detail in the following, by way of example, with reference to the attached figures. In the drawings, the following is shown:

FIG. 5 shows several views of the second disk of the parking lock according to FIG. 1;

DETAILED DESCRIPTION

Figure 1:
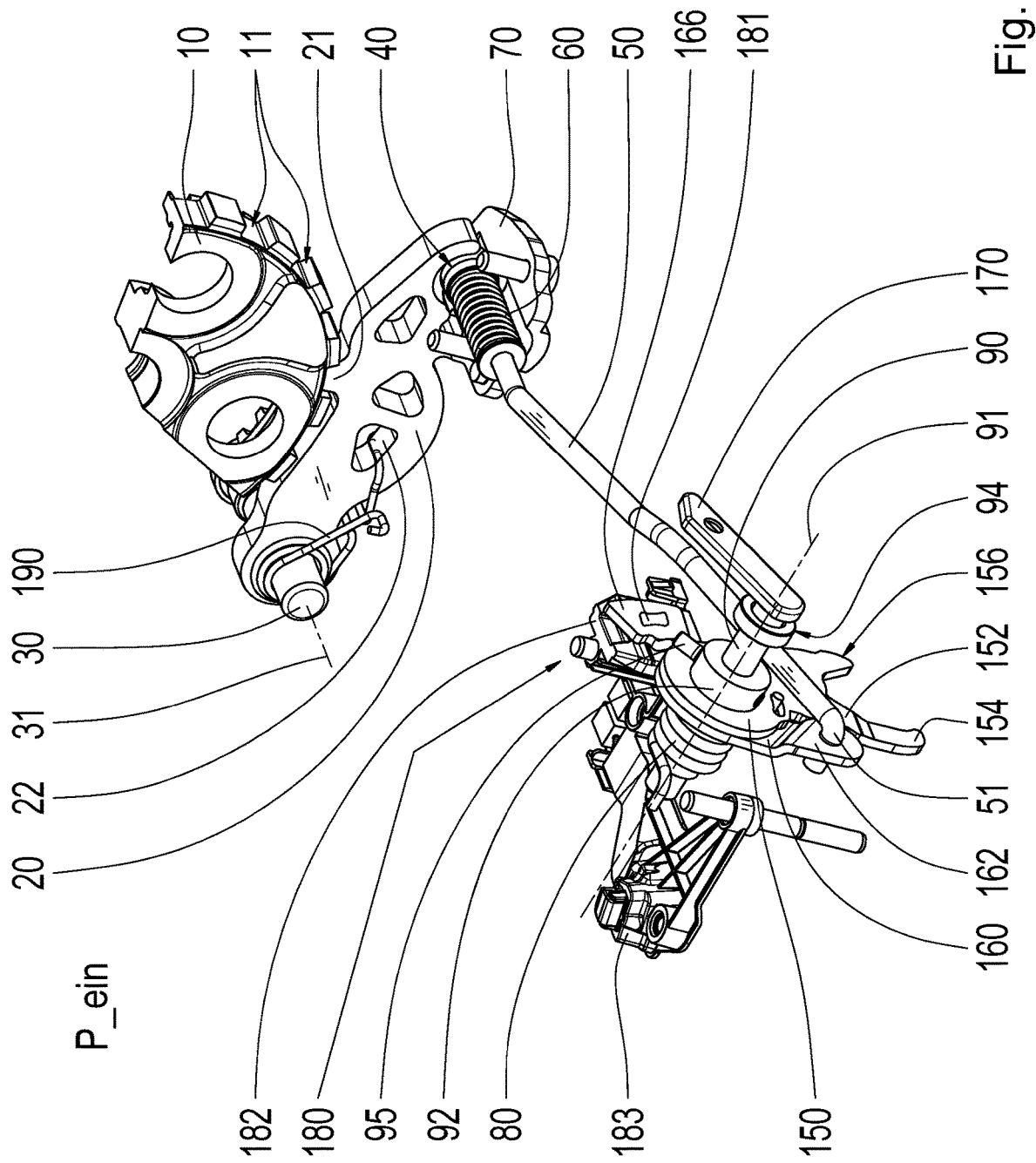
FIG. 1 shows a schematic perspective representation of an exemplary embodiment of a parking lock according to the invention in the "parking lock engaged" shift position.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
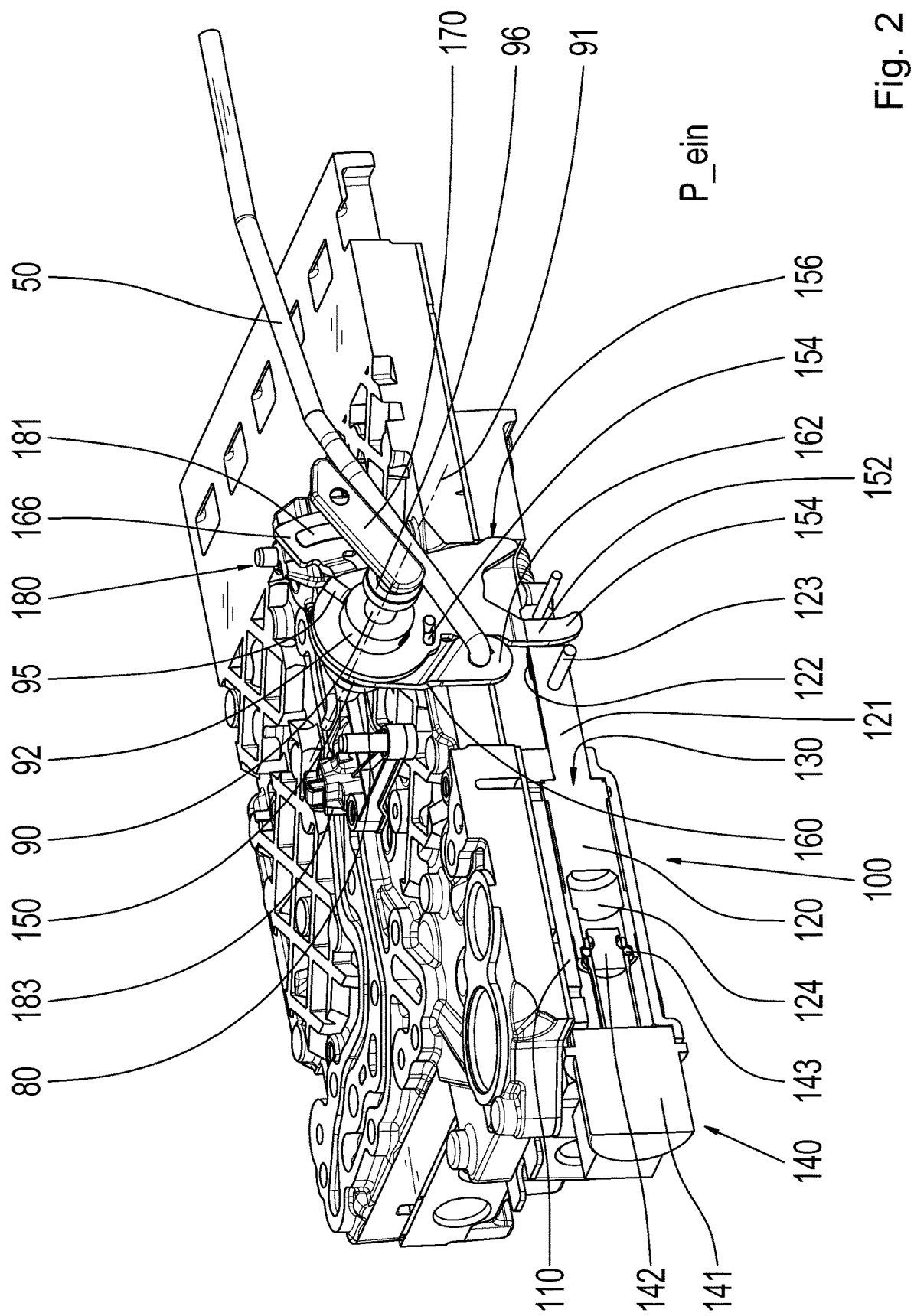
FIG. 2 shows a schematic perspective part cutaway representation of the parking lock according to FIG. 1 in the "parking lock engages" shift position.
Figure 3:
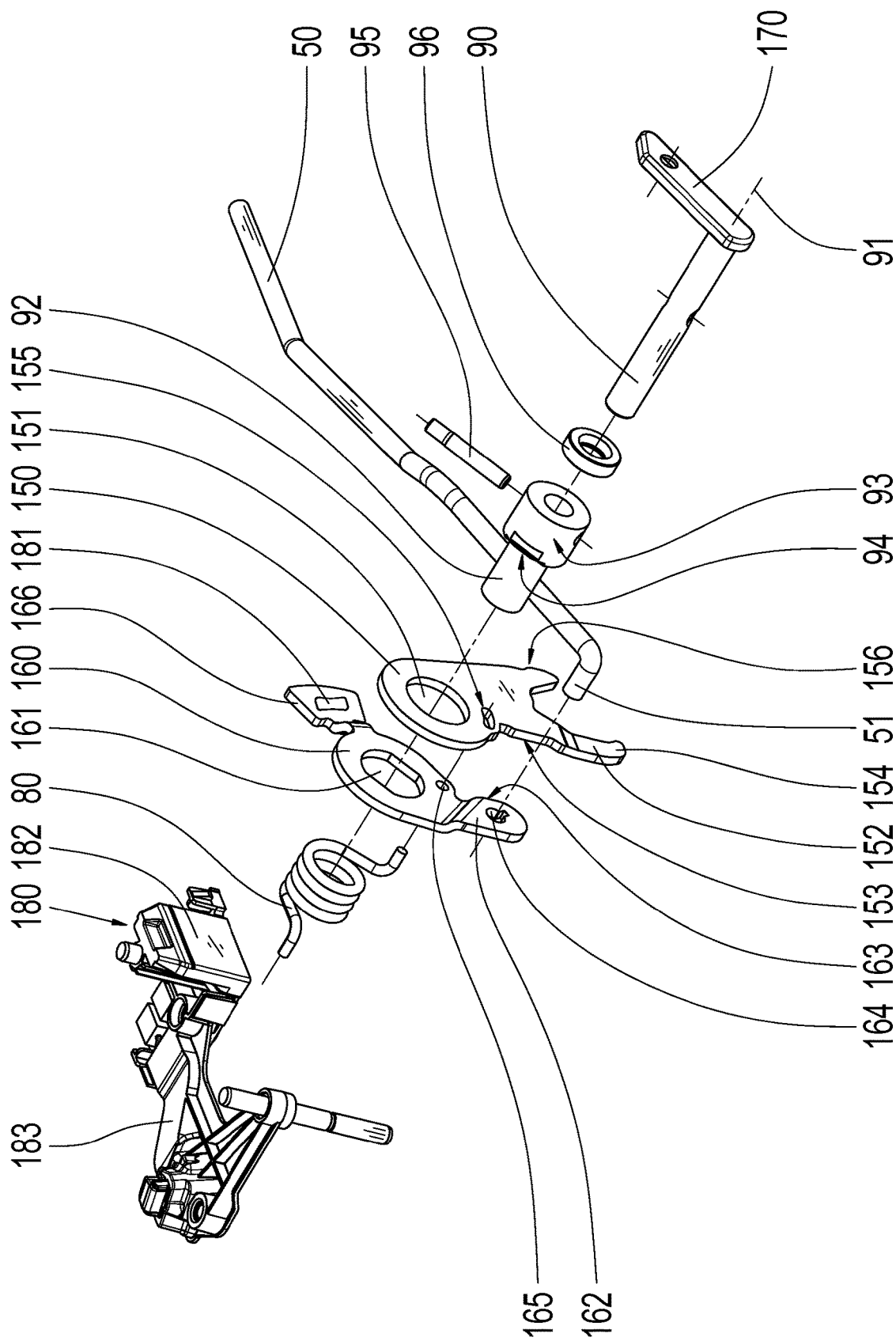
FIG. 3 shows a schematic perspective exploded representation of the parking lock according to FIG. 1.
Figure 4:
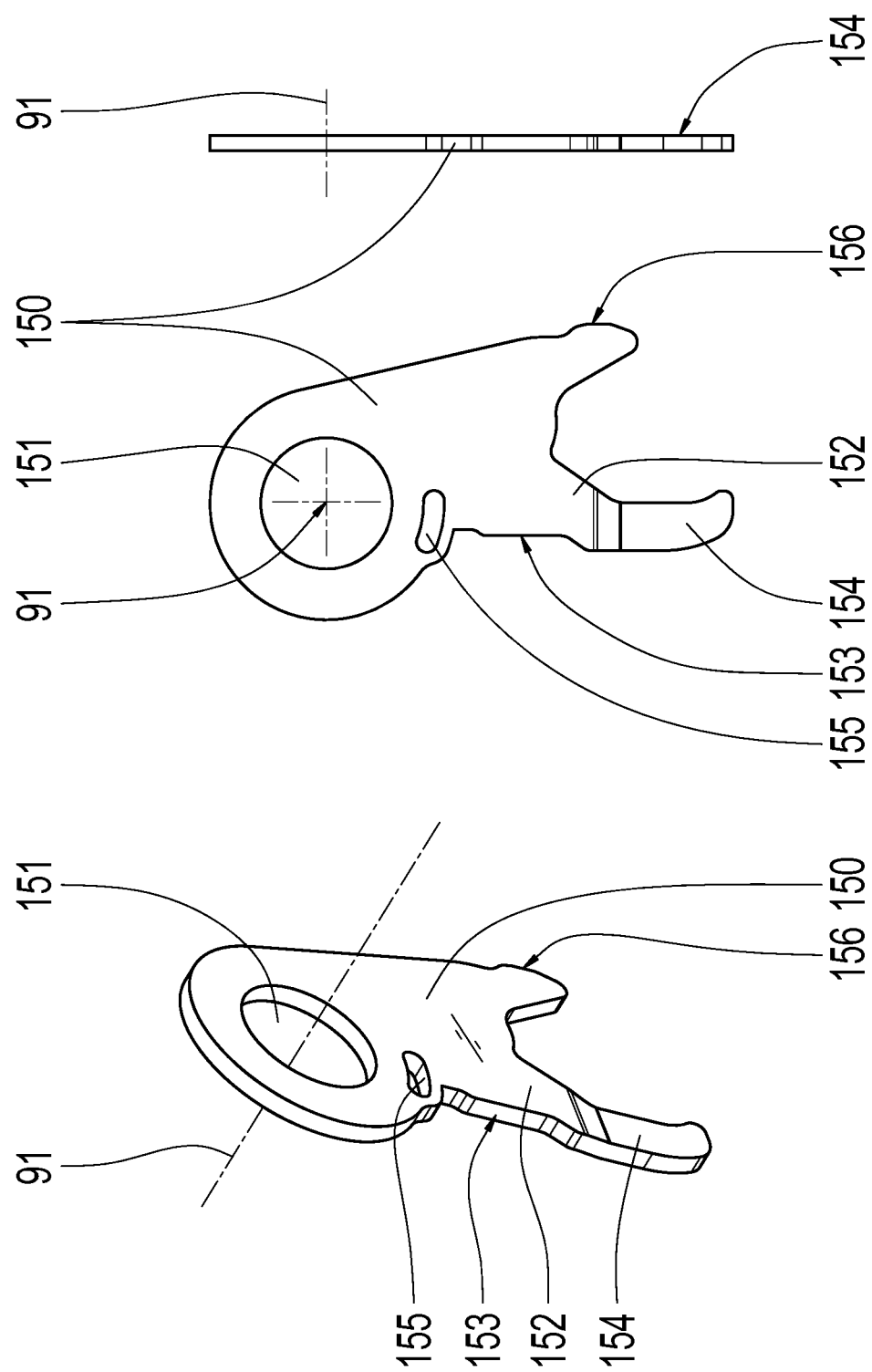
FIG. 4 shows several views of the first disk of the parking lock according to FIG. 1.

A preferred exemplary embodiment of a parking lock according to the invention for an automatic transmission of a motor vehicle is described in greater detail in the following and with reference to FIGS. 1 to 7. FIG. 1 shows a three-dimensional representation of this parking lock in the "parking lock engaged" shift position, marked by the reference character P_ein. FIG. 2 shows a corresponding sectioning and FIG. 3 shows a corresponding exploded representation. FIGS. 4 and 5 show views of two disks, as components of this parking lock, which are essential to the invention. The disks are provided for actuating this parking lock.

The parking lock includes a locking pawl 20 which is pivotably or rotatably mounted on a latch bolt 30 and the ratchet tooth 21 of the locking pawl 20 engages into or disengages from a tooth space 11 of a parking interlock gear 10 connected to the transmission shaft (not represented) of the automatic transmission, depending on the shift position P_ein, P_aus of the parking lock. This parking lock also includes an interlocking element 40 which, in the locked condition—i.e., in the "parking lock engaged" shift condition—is clamped between the locking pawl 20 and a transmission housing-affixed guiding plate 70 in order to prevent the ratchet tooth 21 from being pushed out of the corresponding tooth space 11 of the parking interlock gear 10. In the exemplary embodiment represented, this interlocking element 40 is a locking cone, although, alternatively, the interlocking element 40 can also be a roller element, for example.

A connecting rod 50 is provided for the axial displacement of the interlocking element 40. For this purpose, the interlocking element 40 is axially displaceably attached to the connecting rod 50 at one end of this connecting rod 50 such that the connecting rod 50 presses the interlocking element 40 into the locking position against the spring force of a spring element 60 and pulls the interlocking element 40 out of the locking position once again. In the exemplary embodiment represented, this spring element 60 is a compression spring which concentrically surrounds the connecting rod and rests axially against the connecting rod 50 on its side facing away from the interlocking element 40. The end 51 of the connecting rod 50 facing away from the interlocking element 40 is bent at a right angle and is provided with reference character 51.

The parking lock also includes a hydraulically actuatable actuator 100, with the aid of which the shift position of the parking lock is predefined. As represented in FIG. 2, a piston 120 is arranged axially displaceably in a control housing 110 of the actuator 100, pressure is applied to the piston 120 in order to disengage the parking lock. The corresponding pressure chamber is provided with reference character 130. The pressure chamber 130 is formed, in this case, by an outer surface and a face of the piston bore provided in the control housing 110 for the piston 120 and by a face of the piston 120 and an outer surface of its piston rod 121. The control housing 110 of the actuator 100 is, for example, an integral component of a transmission housing-affixed, electrohydraulic control unit of the automatic transmission. A detent device 140 is provided for the bistable interlock of the piston 120, with the aid of which the piston 120 is mechanically fixable either in its first end position, which is associated with the "parking lock disengaged" shift position, or in its second end position which is associated with the "parking lock engaged" shift position. For this purpose, the detent device 140 includes an electromagnet 141, a piston 142 which is electromagnetically actuatable with the aid of this electromagnet 141, and several actuatable detent elements 143 which are mechanically displaceable in the radial direction by this piston 142. The piston 142 and the detent elements 143 are arranged in a hollow section 124 of the actuator piston 120, and so the detent elements 143 are engageable, in the two end positions of the actuator piston 120, into recesses in the actuator piston 120, which are arranged on an inner diameter of the actuator piston 120. The axial movement direction of the actuator position 120 is therefore blocked or released, depending on the radial position of the detent elements 143. In this case, the detent device 140 is designed in such a way that the detent elements 143 release the axial movement direction of the piston 120 only when the electromagnet 141 is electrically energized. If the electromagnet is not energized, or de-energized, the piston 120 is therefore mechanically fixed either in its first end position which is associated with the "parking lock disengaged" shift position, or in its second end position which is associated with the "parking lock engaged" shift position.

In FIG. 2, the parking lock and the piston 120 are located in the "parking lock engaged" shift position, marked by the reference character P_ein. In order to release the detent, the electromagnet 141 must be electrically energized.

The axial force generated by the actuator 100 for disengaging the parking lock is transmitted to the first disk 150 of the parking lock via the piston rod 121 of the actuator piston 120. For this purpose, the parking lock includes a selector shaft 90, which is mounted in the transmission housing so as to be turnable about its selector shaft longitudinal axis 91, and a hub 92 which is connected, in a torsion-proof manner, to the selector shaft 90 via a cotter pin 95 which has been pressed into the hub 92 and the selector shaft 90 transversely to the selector shaft longitudinal axis 91. The first disk 150 is mounted on a cylindrical section 93 of this hub 92 so as to turn about the selector shaft longitudinal axis 91. The corresponding bearing bore of the first disk 150 is marked with 151. In one alternative embodiment, the hub and the selector shaft can also be a single piece; in another alternative, the first disk can also be displaceably mounted directly on the selector shaft.

The first disk 150 includes a leg 152, on the free end of which a driving section 154 is provided, onto which the hydraulic axial force of the actuator 100 is transmittable or transferable. For this purpose, the end of the piston rod 121 of the actuator piston 120 facing away from the pressure chamber 130 is flattened and is provided with a pin 122 which is pressed into the piston rod 121 transversely to the piston rod longitudinal axis and transmits the tractive force of the piston 120 onto the driving section 154 of the first disk 150. Therefore, an axial movement of the piston 120 initiated by the application of pressure in the pressure chamber 130 is automatically converted into a turning motion of the first disk 150 about the selector shaft longitudinal axis 91 in the direction of rotation intended for the disengagement of the parking lock. In the exemplary embodiment represented here, the first disk 150 turns in the clockwise direction when pressure is applied to the actuator pressure chamber 130. Therefore, the first disk 150 includes a housing stop 156, the function of which will be described further below.

Every turning motion of the first disk 150 in its direction of rotation intended for the disengagement of the parking lock is transmitted, with a kinematic interconnection of a second disk 160 of the parking lock, to the interlocking element 40 of the parking lock. This second disk 160 is connected to the selector shaft 90 in a torsion-proof manner, specifically in this case, by way of example, in a form-fit manner to a flattened section 93 of the hub 92. The (first) recess in the second disk 160 corresponding to this flattened section 93 of the hub 92 is marked with 161. Therefore, the second disk 160 is mounted in the transmission housing so as to be turnable about the selector shaft longitudinal axis 91; the first and the second disks 150, 160 have the same axis of rotation, namely the selector shaft longitudinal axis 91. As viewed three-dimensionally, the two disks 150, 160 of the parking lock are arranged directly adjacent to each other relative to the selector shaft longitudinal axis 91. The turning motion of the first disk 150 in its direction of rotation intended for the disengagement of the parking lock is transmitted onto the second disk 160 in a force-locking manner. For this purpose, a contact surface 153 is provided on the leg 152 of the first disk 150, which acts on a contact surface 163 of the second disk 160 in a force-locking manner. In order to enable these two contact surfaces 153, 163 of the two disks 150, 160, which adjoin one another, to interact, the contact surface 163 of the second disk 160 is arranged on a leg 162 of the second disk 160, which is bent in the axial direction relative to the selector lever longitudinal axis 91, and so the two contact surfaces 153, 163 are located in the same axial plane. Therefore, a turning motion of the first disk 150 about the selector shaft longitudinal axis 91 in the direction of rotation intended for the disengagement of the parking lock, which is initiated by the application of pressure in the pressure chamber 130, is automatically converted into a turning motion of the second disk 160 in the same direction of rotation.

The end 51 of the connecting rod 50 facing away from the interlocking element 40 is articulatedly connected to the second disk 160. For this purpose, the end 51 of the connecting rod 50, which is bent at a right angle, is hung into a second recess 164 in the second disk 160 in such a way that a turning of the second disk 160 in the direction of rotation intended for the disengagement of the parking lock is converted into an axial movement of the connecting rod 50 in the direction suitable for pulling the interlocking element 40 out of its locking position.

In the exemplary embodiment represented here, the second disk 160 additionally includes a second leg 166, on which a signal transmitter 181 of a position sensor 180 is arranged. This signal transmitter 181 communicates, in an advantageous way, contactlessly with a signal receiver 182 of the position sensor 180, wherein this signal receiver 182 is integrated, by way of example, in a sensor carrier 183 attached to the electrohydraulic control unit. The position sensor 180 transmits the presently measured shift position of the parking lock via an electrical lead to an electronic control unit (not represented here in greater detail) of the electrohydraulic control unit, and so the actual shift position of the parking lock of the electronic control unit is available for control tasks.

The spring 80 provided for the engagement of the parking lock is a leg spring made of spring wire, the coils of which concentrically surround the hub 92 (and, therefore, also concentrically surround the selector shaft 90) on that side of the second disk 160 which faces away from the first disk 150, the first leg of which axially, as viewed in the selector lever longitudinal direction, penetrates a bore hole 165 in the second disk 160 as well as a recess 155 in the first disk 150, and the second leg of which rests against the transmission housing in this case, by way of example, via a housing-affixed sensor carrier 183. It is essential in this case that the recess 155 in the first disk 150 has a circular segment-shaped contour, the position of which and the arc-of-a-circle length of which are defined in such a way that, when the actuator piston 120 is located in its second end position A associated with the disengaged condition P_aus of the parking lock, the spring force of the spring 80 acts on both disks 150, 160, whereas, when the actuator piston 120 is located in its first end position E associated with the engaged condition P_ein of the parking lock and, simultaneously, an emergency release device 170 is actuated, the spring force of the spring 80 acts only on the second disk 160. Therefore, the position and the arc-of-a-circle length of the circular segment-shaped recess 155 define an open space for the second leg of the spring 80 at the first disk 150, which is utilized within the scope of the emergency release of the parking lock.

In the exemplary embodiment represented here, the parking lock additionally includes a hold-down spring 190 which acts on the locking pawl 20 and, in the disengaged condition P_aus of the parking lock, prevents the locking pawl 20 from coming into contact with the parking interlock gear 10. The hold-down spring 190 is, by way of example, a leg spring, the coils of which concentrically surround the latch bolt 30, the first leg of which is hung into a recess 22 in the locking pawl 20 and the second leg of which rests against a section (not represented here in greater detail) of the transmission housing. In the exemplary embodiment represented here, the hold-down spring 190 is cost-effectively made of spring wire.

As described above, the parking lock also includes an emergency release device, marked by reference character 170 and with the aid of which the parking lock is mechanically transferable from the condition P_ein into the condition P_aus in the event of failure of the hydraulic and/or electrical control of the actuator 100. In this case, the emergency release device 170 mechanically acts directly onto the second disk 160 of the parking lock. In the exemplary embodiment represented here, the emergency release device 170 is a manually actuatable lever which is connected to the selector shaft 90 in a torsion-proof manner. Therefore, an actuation of this lever 170 in the direction intended for the emergency disengagement of the parking lock directly results in a turning of the second disk 160 also in the parking lock disengagement direction. The fact that this is possible, and why, even though the actuator piston 120 is located, mechanically interlocked, in its end position E associated with the condition P_ein, is explained in detail further below.

Since the emergency release lever 170 in the exemplary embodiment represented is arranged outside the transmission housing, the selector shaft 90 penetrates a housing wall (not represented here in greater detail) of the transmission housing. In a logical way, a sealing ring 96 is therefore provided for sealing this penetration point, which is inserted into a matching housing wall bore hole and through which the selector shaft 90 centrally extends.

As has already been explained in detail, the actuator 100 provided for disengaging the parking lock during the normal operation of the transmission includes an electromagnetically actuatable, bistable detent device 140 which, when the electromagnet 141 of the detent device 140 is electrically dead, mechanically interlocks the actuator piston 120 either in its end position E (corresponding to the condition P_ein) or in its end position A (corresponding to the condition P_aus), i.e., interlocks against an axial movement, depending on the present shift position of the parking lock.

Figure 6:
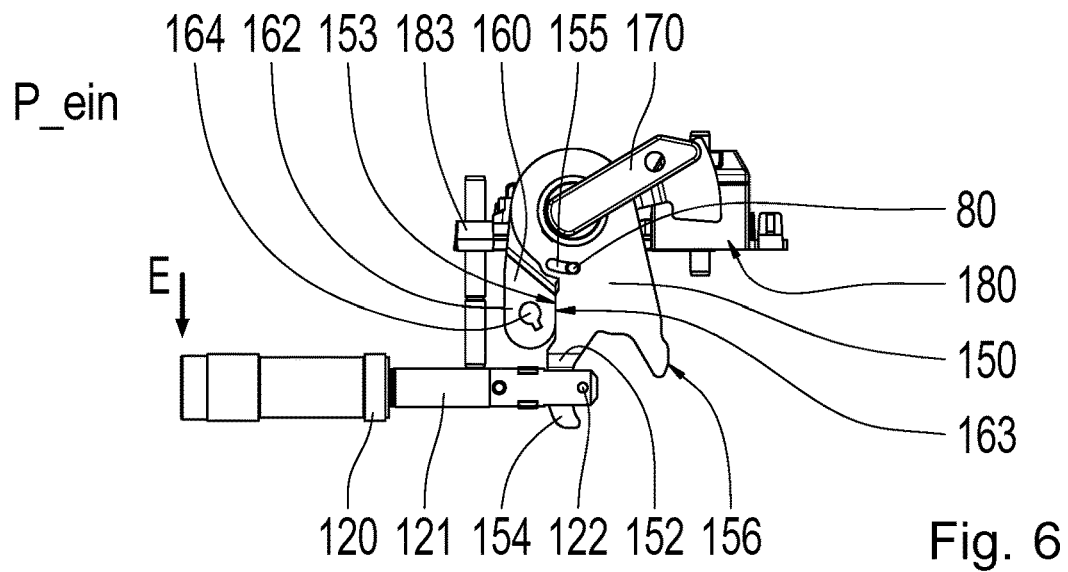
FIG. 6 shows a view of the parking lock according to FIG. 1 in the "parking lock engaged" shift position.
Figure 7:
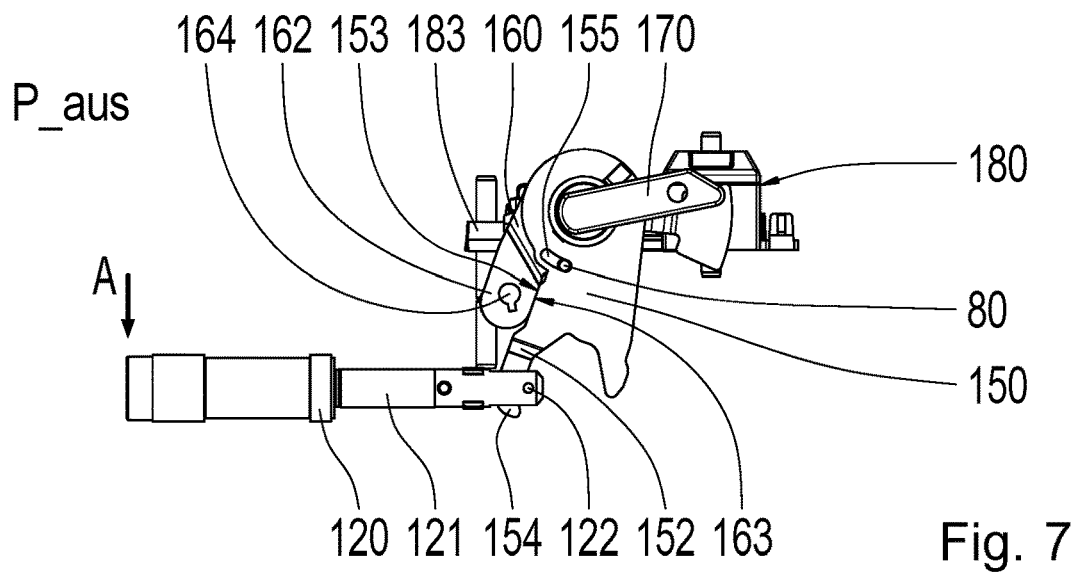
FIG. 7 shows a view of the parking lock according to FIG. 1 in the "parking lock disengaged" shift position.
Figure 8:
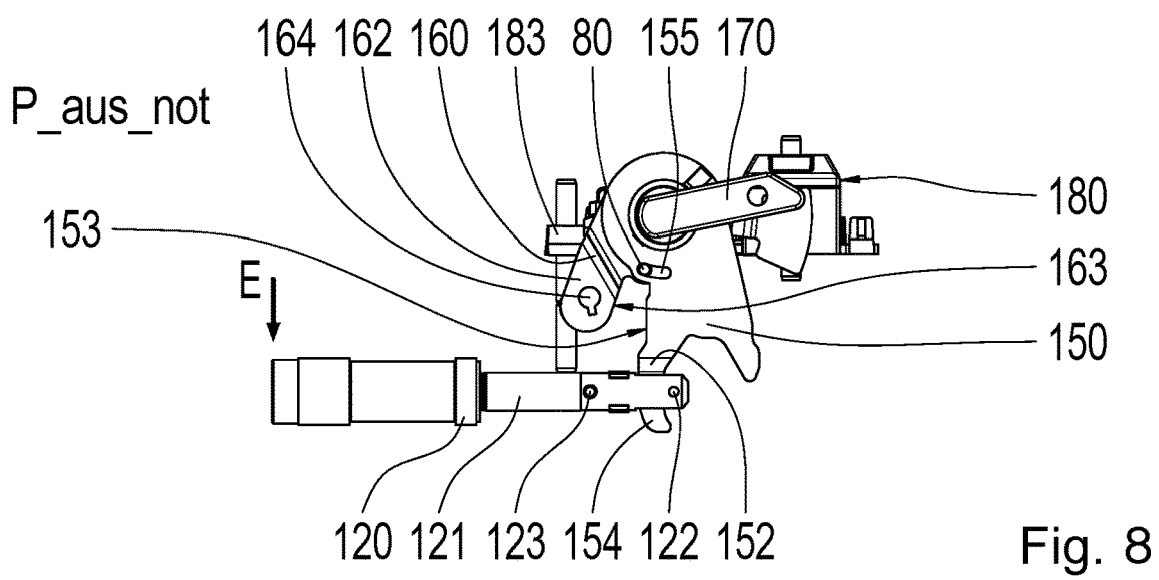
FIG. 8 shows a view of the parking lock according to FIG. 1 in the "parking lock emergency-released" shift position.

Only the particular design of the two disks 150 and 160, which are mechanically coupled to each other via a defined open space, of which the first disk 150 is turnable or rotatable by the actuator 100 and the second disk is permanently articulatedly connected to the connecting rod 50 acting on the interlocking element 40 of the parking lock, enables the connecting rod 50 to be axially displaced in order to disengage the parking lock in the event of an actuation of the emergency release device 170, without the need to release the detent of the piston 120 which is still fixed in its piston position corresponding to the engaged condition P_ein of the parking lock, which is explained in greater detail in the following with reference to FIGS. 6 to 8 and the functional sequences during the engagement and disengagement of the parking lock.

FIG. 6 shows a view of the actuating device of the parking lock according to the invention in the "parking lock engaged" shift position, marked by the reference character P_ein, wherein the end position of the piston 120 associated with the shift position P_ein is provided with reference character E. FIG. 7 shows a view of this actuating device in the "parking lock disengaged" shift position, marked by the reference character P_aus, wherein the end position of the piston 120 associated with the shift position P_aus is provided with reference character A. Finally, FIG. 8 shows a view of this actuating device in the "parking lock emergency-released" shift position, in which the parking lock has been disengaged due to an actuation of the emergency release device, marked by the reference character P_aus_not, wherein the piston 120, in this shift position P_aus_not, is located in its end position E once again. In the following description, some components of the parking lock are described, which are not shown in FIGS. 6 to 8 for the sake of clarity, but which have already been explained in the description of FIGS. 1 to 4 and, therefore, are also provided with the appropriate reference characters in the following description.

Proceeding from the condition P_ein, in which the parking lock is engaged, the embodiment of the actuator 100 according to the invention presupposes the following functional sequence upon disengagement of the parking lock during the normal operation of the automatic transmission, given an ensured hydraulic and electrical supply of the actuator 100:

In the basic condition P_ein, the pressure chamber 130 of the actuator 100 is vented on the control unit-side. The piston 120 of the actuator 100 is located in its first end position E, as shown in FIGS. 1, 2 and 6, wherein the piston 120 has been mechanically fixed by the detent device 140. The electromagnet 141 of the detent device 140 is dead. The interlocking element 40 is located in its locking position, in which it is clamped between the guiding plate 70 and the locking pawl 20.

In order to enable the parking lock to be disengaged proceeding from the shift position P_ein, the electromagnet 141 is initially energized, with the result that the detent device 140 releases the piston 120 which it previously blocked. Approximately at the same time, pressure is applied to the previously non-pressurized pressure chamber 130 of the actuator 100, with the result that the piston 120 moves axially in the direction of the electromagnet 141 against the spring force of the spring 80, due to the pressure acting on the piston 120, until its end position A predefined by a stop 123 is reached. In the exemplary embodiment represented here, this stop 123 is formed as a pin which has been inserted into the piston rod 121 and which, in the end position A, impacts a surface of the control housing 110 provided therefor. The axial movement of the piston 120 is converted, via the pin 122 inserted in the piston rod 121 and the driving part 154 of the first disk 150, into a turning motion of the first disk 150 about its axis of rotation 91 in the direction of rotation intended for the disengagement of the parking lock.

This turning motion of the first disk 150 is transmitted via the contact surface 153 of the first disk 150 onto the contact surface 163 of the second disk 160, and so a turning motion of the first disk 150 in the direction of rotation intended for the disengagement of the parking lock results in a turning motion of the second disk 160 in the same direction of rotation.

This turning motion of the second disk 160 is transmitted to the interlocking element 40 via the connecting rod 50 which has been articulatedly hung into the second recess 164 in the second disk 160, and so the interlocking element 40 is mechanically pulled out of its locking position, with the result that the locking pawl 20 is pivoted due to the force vectors acting thereon and, in so doing, the ratchet tooth 21 is pivoted out of the tooth space 11 of the locking toothing of the parking interlock gear 1. The parking lock is now located in the condition P_aus; all components involved are now located in the position represented in FIG. 7. In this condition, the electromagnet 141 is now switched to dead once again, and so the detent device 140 mechanically fixes the piston 120 of the actuator 100 in its end position A. This mechanical detent of the piston 120 secures the parking lock system against an unintentional engagement of the parking lock, which would be possible, for example, in the event of a pressure level which is not sufficient for the situation or in the event of a hydraulic defect in the pressure supply to the pressure chamber 130 of the actuator 100.

Proceeding from the condition P_aus, in which the parking lock is disengaged, the embodiment of the actuator 100 according to the invention presupposes the following functional sequence upon engagement of the parking lock during the normal operation of the automatic transmission, given an ensured hydraulic and electrical supply of the actuator 100:

In the basic condition P_aus, pressure is applied to the pressure chamber 130 of the actuator 100 acting on the piston 120. As shown in FIG. 7, the piston 120 of the actuator 100 is located in its end position A, wherein the piston 120 is mechanically fixed by the detent device 140. The electromagnet 141 of the detent device 140 is dead.

In order to enable the parking lock to be engaged proceeding from the shift position P_aus, the electromagnet 141 is initially energized, with the result that the detent device 140 releases the piston 120 of the actuator 100, which it previously blocked. Approximately at the same time, the pressure chamber 130 of the actuator 100, to which pressure was previously applied, is vented, with the result that the piston 120 is moved axially, via the spring force of the spring 80, in the direction opposite the electromagnet 141, until it reaches its end position E which is predefined by the housing stop 156 provided on the first disk 150.

This axial movement of the piston 120 is converted, via the pin 122 inserted in the piston rod 121 and the driving part 154 of the first disk 150, into a turning motion of the first disk 150 about its axis of rotation 91 in the direction of rotation intended for the engagement of the parking lock. This turning motion of the first disk 150 is transmitted via the contact surface 153 of the first disk 150 onto the contact surface 163 of the second disk 160, and so a turning motion of the first disk 150 in the direction of rotation intended for the engagement of the parking lock results in a turning motion of the second disk 160 in the same direction of rotation. This turning motion of the second disk 160 is transmitted via the connecting rod 50, which has been articulatedly hung into the second recess 164 in the second disk 160, onto the interlocking element 40 and, via the interlocking element 40, onto the locking pawl 20, with the result that, when the ratchet tooth 21 hits a tooth space 11 of the locking toothing of the parking interlock gear 10 and is not repelled by the outer diameter of the locking toothing due to a rotational speed of the parking interlock gear 10 which is too high, the ratchet tooth 21 engages into this tooth space 11 in a form-fit manner and, as a result, fixes the parking interlock gear 10.

The parking lock is now located in the condition P_ein; all components involved are now once again located in the position represented in FIGS. 1, 2 and 6. The piston 120 of the actuator 100 is located in its end position E, in which, in the exemplary embodiment represented here, the stop 156 of the first disk 150 rests against a housing wall of the electrohydraulic control unit. In this condition P_ein, the electromagnet 141 is now switched to dead once again, and so the detent device 140 mechanically fixes the piston 120 its first end position E facing away from the electromagnet 141.

A failure of the control of the actuator 100 in the condition P_aus, in which the parking lock is disengaged, does not pose a problem, since the parking lock cannot independently change its shift position due to the present mechanical interlock of the piston 120, and the automatic transmission therefore remains, unchanged, in the shift position P_aus known to the driver and the motor vehicle is movable with the automatic transmission unchanged.

In the event of a failure of the control of the actuator 100 in the condition P_ein, in which the parking lock is engaged, the emergency release device 170 is available to the driver of the motor vehicle in which the automatic transmission including the parking lock according to the invention is installed, in order to enable the parking lock to be disengaged even without the actuator 100. In the basic condition P_ein, the components involved are located in their respective positions as shown in FIGS. 1, 2 and 6.

An actuation of the emergency release device 170, which is a lever in this case, initiates a turning of the selector shaft 90, which is connected to the emergency release device 170 in a torsion-proof manner, about the selector shaft longitudinal axis 91 in the direction of rotation intended for the disengagement of the parking lock and, therefore, also initiates a turning of the second disk 160, which is connected to the selector shaft 90 in a torsion-proof manner, in the same direction. The turning of the second disk 160 initiated by the emergency release device 170 is converted into an axial movement of the connecting rod 50 in the direction intended for the disengagement of the parking lock, and so the connecting rod 50, which has been articulatedly hung into the second recess 164 in the second disk 160, pulls the interlocking element 40 out of its locking position, as is the case during the normal operation, and, as a result, disengages the parking lock.

It is essential that the turning of the second disk 160, which is due to the open space which is active in the direction of rotation and which is implemented in the form of the arc-of-a-circle-shaped recess 155 provided in the first disk 150, does not cause a reaction onto the first disk 150. The piston 120 of the actuator 100 remains, mechanically interlocked, in its end position E, but it does not now prevent the disengagement of the parking lock. The parking lock is now located in the condition P_aus_not, in which the parking lock is "emergency-released" via actuation of the emergency release device 170; all components involved are located in the position represented in FIG. 8.

If the actuation of the emergency release device 170 is now terminated, the spring force of the spring 80 initiates the engagement of the parking lock.

Modifications and variations can be made to the embodiments illustrated or described herein without departing from the scope and spirit of the invention as set forth in the appended claims.

REFERENCE CHARACTERS

10 parking interlock gear
11 tooth space of the locking toothing of the parking interlock gear
20 locking pawl
21 ratchet tooth of the locking pawl
22 recess in the locking pawl
30 latch bolt
31 latch bolt longitudinal axis; locking pawl swivel axis
40 interlocking element; locking cone
50 connecting rod
51 end of the connecting rod bent at a right angle
60 spring element; compression spring
70 housing-affixed guiding plate
80 spring; leg spring
90 selector shaft
91 selector shaft longitudinal axis
92 hub of the selector shaft;
93 cylindrical section of the hub; bearing section of the selector shaft
94 flattened section of the hub; driving section of the selector shaft
95 cotter pin
96 sealing ring
100 actuator
110 control housing of the actuator
120 piston of the actuator
121 piston rod of the piston
122 driving part of the piston; pin
123 stop of the piston; pin
124 cavity of the piston
130 pressure chamber of the actuator
140 detent device of the actuator
141 electromagnet of the detent device
142 electromagnetically actuatable piston of the detent device
143 detent element of the detent device 150 first disk
151 bearing bore of the first disk
152 leg of the first disk
153 contact surface on the leg of the first disk
154 driving section on the leg of the first disk; piston rod driving part of the first disk
155 recess in the first disk for the leg spring
156 housing stop of the first disk
160 second disk
161 first recess in the second disk; selector shaft driving part of the second disk
162 bent leg of the second disk
163 contact surface on the leg of the second disk
164 second recess in the second disk; connecting rod driving part on the leg of the second disk
165 bore hole in the second disk for the leg spring
166 second leg of the second disk
170 emergency release device; lever
180 position sensor
181 signal transmitter of the position sensor
182 signal receiver of the position sensor
183 sensor carrier of the position sensor
190 hold-down spring
A first end position of the piston; position of the piston in the "parking lock disengaged" condition
E second end position of the piston; position of the piston in the "parking lock engaged" condition
P_aus disengaged condition of the parking lock
P_aus_not disengaged condition of the parking lock
P_ein engaged condition of the parking lock

The invention claimed is:

1. A parking lock of an automatic transmission for a vehicle, comprising:
   a latch bolt (30) mounted in a housing of the automatic transmission and having a latch bolt longitudinal axis (31);
   a parking interlock gear (10) having a locking toothing with a tooth space (11);
   a locking pawl (20) pivotably mounted on the latch bolt (30) about the latch bolt longitudinal axis (31) and including a ratchet tooth (21) engagable into the tooth space (11) to block the parking interlock gear (10) against rotation when the parking lock is in an engaged condition (P_ein);
   a connecting rod (50) having an interlocking element (40) spring-mounted counter to a parking lock disengagement direction, the interlocking element (40) engaging the ratchet tooth (21) into the tooth space (11) and preventing the ratchet tooth (21) from disengaging the tooth space (11) when the parking lock is in the engaged condition (P_ein);
   a spring (80), a spring force of the spring (80) being transmittable onto the connecting rod (50) to engage the parking lock;
   a hydraulically actuatable actuator (100) including a piston (120) and a control housing (110), the piston (120) being axially displaceable in the control housing (110) by hydraulic pressure to disengage the parking lock, an axial movement of the piston (120) being transmittable onto the connecting rod (50);
   an emergency release device (170) manually actuatable from outside the housing of the automatic transmission, the force of the emergency release device (170) being transmittable onto the connecting rod (50) for the emergency release of the parking lock when the actuator (100) is inoperable;
   a selector shaft (90) mounted in the housing of the automatic transmission and having a selector shaft longitudinal axis (91);
   a first disk (150) rotatably mounted on the selector shaft (90) about the selector shaft longitudinal axis (91) and being articulatedly connected or operatively connected to the piston (120) such that the axial movement of the piston (120) rotates the first disk (150) about the selector shaft longitudinal axis (91), and vice versa; and
   a second disk (160) connected to the selector shaft (90) in a torsion-proof manner and articulatedly connected to an end (51) of the connecting rod (50) opposite from the interlocking element (40) such that rotation of the second disk (160) causes an axial movement of the connecting rod (50), and vice versa,
   wherein the actuator (100) further includes a detent device (140) having an electromagnet (141), the detent device (140) being actuatable by the electromagnet (141) to mechanically fix the piston (120) either in a first end position (A), associated with a disengaged condition (P_aus) of the parking lock, or in a second end position (E), associated with the engaged condition (P_ein), when the electromagnet (141) is electrically de-energized, wherein a detent in the respective piston position is releasable when the electromagnet (141) is energized,
   wherein the emergency release device (170) is connected in a torsion-proof manner to the selector shaft (90), the selector shaft (90) being rotatable about the selector shaft longitudinal axis (91) by a predefined angle in a direction of rotation intended for disengaging the parking lock upon actuation of the emergency release device (170),
   wherein the spring (80) is tensioned between the second disk (160) and the housing of the automatic transmission such that the spring force of the spring (80) acts via the second disk (160) on the connecting rod (50) in a direction intended for the engagement of the parking lock, and
   wherein the first and the second disks (150, 160) are mechanically operatively connected to each other via contact surfaces (153, 163) such that
      a rotation of the second disk (160) initiated by the spring (80) in the direction intended for the engagement of the parking lock causes a rotation of the first disk (150) in the direction intended for the engagement of the parking lock,
      a rotation of the first disk (150) initiated by the piston (120) of the actuator (100) in the direction intended for the disengagement of the parking lock causes a rotation of the second disk (160) in the direction intended for the disengagement of the parking lock, and
      a rotation of the second disk (160) initiated by the emergency release device (170) causes no rotation of the first disk (150).

2. The parking lock of claim 1, wherein the spring (80) is a leg spring, coils of the spring (80) concentrically surrounding the selector shaft (90) or a section of a hub (92) which is connected in a torsion-proof manner to the selector shaft (90), a first leg of the spring (80) resting against the housing or a housing-affixed component (183) of the automatic transmission, and a second leg of the spring (80) engaging into a circular segment-shaped recess (155) in the first disk (150) as well as into a bore hole (165) of the second disk (160).

3. The parking lock of claim 1, wherein the selector shaft (90) penetrates an outer wall of the housing of the automatic transmission, and the emergency release device (170) is a lever which is arranged outside the housing of the automatic transmission and is connected to the selector shaft (90) in a torsion-proof manner outside the housing of the automatic transmission.

4. The parking lock of claim 1, wherein the emergency release device (170) is a lever which is arranged within the housing, connected to the selector shaft (90) in a torsion-proof manner, and actuatable from outside the housing with a tool.

5. The parking lock of claim 1, further comprising a sensor transmitter (181) of a position sensor (180) arranged on the second disk (160), with the position sensor (180) operable to detect whether the parking lock is located in the engaged condition (P_ein) or in the disengaged condition (P_aus).

6. The parking lock of claim 5, wherein the position sensor (180) is a contactless measuring sensor.

7. The parking lock of claim 1, further comprising a hold-down spring (190) attached to or hung into the locking pawl (20), wherein the hold-down spring (190) prevents the locking pawl (20) from coming into contact with the parking interlock gear (10) in the disengaged condition (P_aus) of the parking lock.

8. The parking lock of claim 7, wherein the hold-down spring (190) is a leg spring, coils of the hold-down spring (190) concentrically surrounding the latch bolt (30), a first leg of the hold-down spring (190) engaging into a recess (22) in the locking pawl (20), and a second leg of the hold-down spring (190) resting against the housing or a housing-affixed component of the automatic transmission.

* * * * *